June 2, 1925.
R. M. RYAN
AUTOMOBILE LICENSE LAMP
Filed Feb. 24, 1922
1,540,225
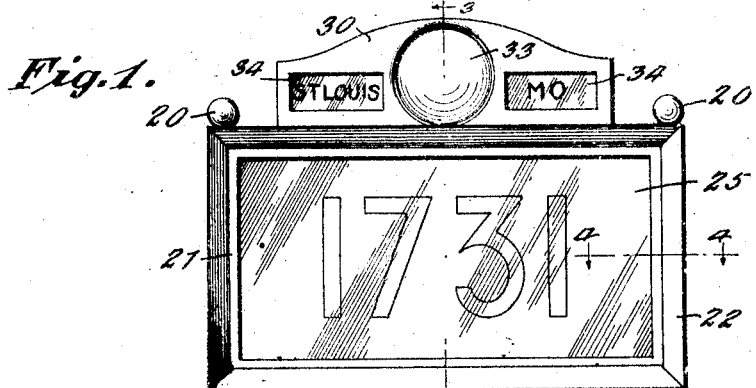
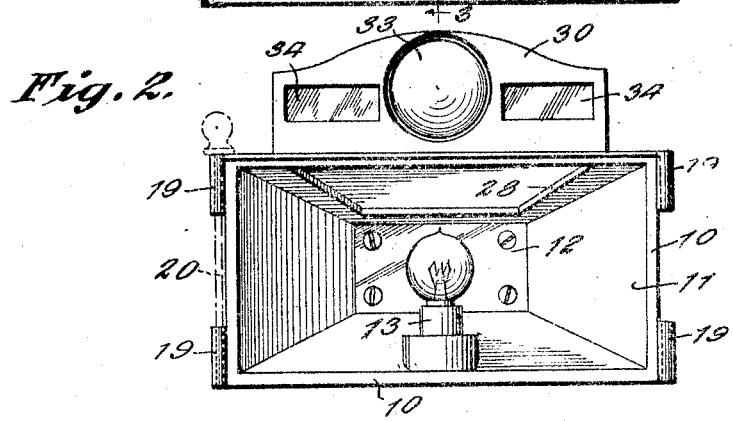
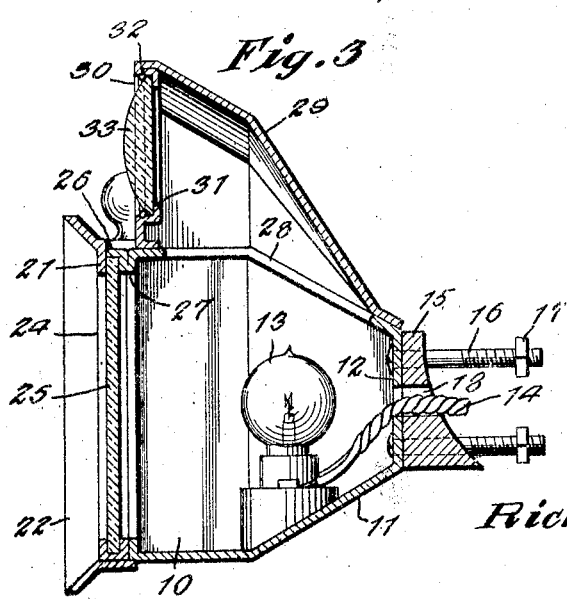
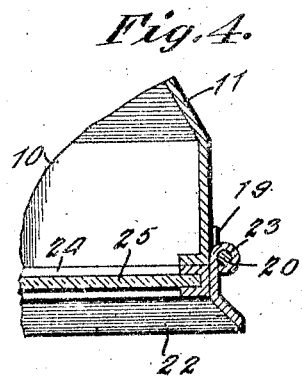
Inventor
Richard M. Ryan
By
Attorney Patented June 2, 1925.

1,540,225

UNITED STATES PATENT OFFICE.

RICHARD MICHAEL RYAN, OF ST. LOUIS, MISSOURI.

AUTOMOBILE LICENSE LAMP.

Application filed February 24, 1922. Serial No. 538,930.

*To all whom it may concern:*

Be it known that RICHARD MICHAEL RYAN, a citizen of the United States, residing at St. Louis and State of Missouri, have invented certain new and useful Improvements in Automobile License Lamps, of which the following is a specification.

This invention has reference to a lamp for automobiles and particularly to a combined lamp and license holder of novel construction.

An important object of the invention is to provide an automobile license lamp of the character above specified which is provided with removable parts capable of being replaced when broken or otherwise damaged and so constructed as to permit ready access to the interior of the lamp-casing whenever required, as for repairs or the like.

An additional object is to provide an automobile license lamp in which a single lamp is used to illuminate both the license plate and a lens, the latter constituting the rear or tail light of the automobile.

Various other objects and advantages of the invention will become apparent during the continuance of the following description.

In the drawing:

Figure 1 is a front elevation of the lamp.

Figure 2 is a front elevation of same with the license plate removed to disclose the interior.

Figure 3 is a vertical central section taken transversely of the device on line 3—3 of Figure 1, and Figure 4 is a sectional detail view taken on line 4—4 of Figure 1.

The invention embodies a lamp-enclosing casing presenting an aproximately rectangular front 10 which is open and rearwardly sloping walls 11 of tapered formation which converge toward the back plate 12 with which they are integral. The inner surface of the sloping walls may be polished to reflect the light from a suitable electric lamp 13 mounted within the casing and connected to a suitable source of current by a lamp-cord 14.

An attaching member 15 which can be designed to fit any automobile is fastened on the outside of back plate 12 by means of long bolts 16 having nuts 17 for securing the casing in place. Both the rear wall 12 and member 15 are provided with a central aperture 18 thru which passes the cord 14. Integral with each corner of the casing and arranged in vertical alignment on opposite sides thereof are tubular lugs 19 which receive hinge pins 20. These pins are headed as illustrated.

At the opened end of part 10 is arranged a guard or door 21 rectangular in shape and having outwardly flaring flanges 22 as shown. Integral with the door and on each side thereof is a curled extension or knuckle 23 which fits into the space between each pair of aligned lugs being held in place by pin 20. Both pins 10 may be lifted out to permit removal of the door or if desired, only one pin may be removed whereupon the door will be free to swing outwardly about the other pin as a pivot or hinge.

A suitable grooved frame 24 is provided in door 21 to receive a transparent license plate 25 which drops into the grooves or guides of the frame from the top of the latter. When the door is closed this plate is held securely in place by a resilient strip or catch 26 integral with the upper edge of the casing and extending over upon the license plate to hold same tight and secure. This catch is bent upon itself, as shown in Figure 3, to provide a depending flange or shoulder 27 which presses outwardly against the plate.

The top wall of the lamp-casing is provided with a large opening 28 over which is arranged a hood 29. The front end of the hood is closed by a vertical plate 30 in the center of which is a circular socket 31. Secured in this socket by an elastic ring 32 is a red colored lens 33 which is illuminated by the light rays of the lamp penetrating the interior of the hood thru opening 28.

Lens plate 30 may be of suitable metal and is provided with a glass panel 34 upon each side of lens 33, upon which panel may be imprinted or otherwise placed the city and State in which the license granted. The hood is so constructed that sections of the enclosing walls are disposed in relative angular arrangement for deflecting the light ray thru the lens or panel-plate 30. The inner surfaces of the wall section being polished to provide reflectors. The various parts of the device may be soldered together to provide water tight joints and catch-strip 26 extends longitudinally of the top edge of casing 10 as shown in Figure 3, providing a gutter for shedding water from the top of the lamp.

From the foregoing it is believed that the advantages and novel features of the invention will be readily understood and it will be noted that such changes in the arrangement and combination of parts may be resorted to as fall properly within the scope of the appended claims.

What is claimed is

1. An automobile license lamp including a lamp casing having a front opening, a closure for the said opening including a transparent license plate and a door hinged to the casing adjacent the side of the opening, the said door presenting vertical guides open at the top to receive the said plate therein, and a resilient strip projecting horizontally from the casing adjacent the upper edge of the opening to engage over and press upon the upper edge of the said license plate when the said door is closed, said strip having a depending shoulder engageable with the inner face of the said plate for pressing outwardly against the same.

2. An automobile license lamp including a lamp casing having a front opening, a door pivoted to the said casing for closing the opening, a transparent license plate, guides on said door for engaging and supporting said plate along its bottom and sides, and a spring strip integral with the casing and projecting outwardly therefrom to engage over the upper edge of the plate when the door is closed, said strip being bent upon itself to provide a depending flange adapted to press outwardly against the inner face of the said plate.

3. An automobile license lamp including a lamp casing having a front opening, a frame confronting the said opening and presenting bottom and side grooves, a transparent license plate accommodated in the said grooves, means for connecting the said frame with the said casing, and a spring extension on said casing for engaging over the upper edge of the said plate, said extension being co-extensive with the upper edge of the plate and being bent upon itself to provide a depending shoulder adapted to bear outwardly against the said plate.

In testimony whereof I affix my signature.

RICHARD MICHAEL RYAN.